United States Patent
Yamada et al.

(10) Patent No.: US 12,202,079 B2
(45) Date of Patent: Jan. 21, 2025

(54) WELDING DEVICE FOR PLATE LAMINATED BODY IN HORIZONTAL ORIENTATION AND PRODUCING METHOD FOR PLATE STRUCTURE THEREOF

(71) Applicant: MAYEKAWA MFG. CO., LTD., Tokyo (JP)

(72) Inventors: Keisuke Yamada, Tokyo (JP); Tetsuji Terada, Tokyo (JP); Daisuke Miyazaki, Tokyo (JP); Hideki Shudai, Tokyo (JP)

(73) Assignee: MAYEKAWA MFG. CO., LTD., Tokyo (JP)

( * ) Notice: Subject to any disclaimer, the term of this patent is extended or adjusted under 35 U.S.C. 154(b) by 682 days.

(21) Appl. No.: 17/612,415

(22) PCT Filed: Jun. 11, 2019

(86) PCT No.: PCT/JP2019/023022
§ 371 (c)(1),
(2) Date: Nov. 18, 2021

(87) PCT Pub. No.: WO2020/250293
PCT Pub. Date: Dec. 17, 2020

(65) Prior Publication Data
US 2022/0241905 A1 Aug. 4, 2022

(51) Int. Cl.
B23K 37/047 (2006.01)
B23K 37/053 (2006.01)
B25J 9/16 (2006.01)

(52) U.S. Cl.
CPC .......... *B23K 37/047* (2013.01); *B23K 37/053* (2013.01); *B25J 9/1633* (2013.01)

(58) Field of Classification Search
CPC ................ B23K 37/047; B23K 37/053; B23K 37/0538; B23K 2101/14
See application file for complete search history.

(56) References Cited

U.S. PATENT DOCUMENTS

| 4,644,129 A | 2/1987 | Miller |
| 2019/0151977 A1 | 5/2019 | Kitagawa |
| 2019/0232410 A1 | 8/2019 | Kitagawa |

FOREIGN PATENT DOCUMENTS

| CN | 203649780 U | * 6/2014 |
| EP | 3446823 A1 | 2/2019 |
| JP | H0760445 A | 3/1995 |
| JP | H07323370 A | 12/1995 |

(Continued)

OTHER PUBLICATIONS

International Search Report issued in Intl. Appln. No. PCT/JP2019/023022 mailed Aug. 27, 2019. English translation provided.
(Continued)

*Primary Examiner* — John P. Dulka
(74) *Attorney, Agent, or Firm* — ROSSI, KIMMS & McDOWELL LLP

(57) ABSTRACT

A welding device for a plate laminated body according to an embodiment includes a welding torch, a chuck for gripping a plurality of laminated plates with a lamination direction being in a horizontal position, and at least one support extending along the lamination direction for supporting the plate laminated body from below.

10 Claims, 6 Drawing Sheets

(56) References Cited

FOREIGN PATENT DOCUMENTS

| JP | H1190685 A | 4/1999 |
|----|------------|--------|
| JP | 5690532 B2 | 3/2015 |
| WO | 2018066136 A1 | 4/2018 |
| WO | 2018066137 A1 | 4/2018 |

OTHER PUBLICATIONS

Written Opinion issued in Intl. Appln. No. PCT/JP2019/023022 mailed Aug. 27, 2019.
Extended European Search Report issued in European Appln. No. 19932286.8 mailed on Apr. 8, 2022.
English translation of Written Opinion issued in Intl. Appln. No. PCT/JP2019/023022 mailed Aug. 27, 2019, previously cited in IDS filed Nov. 18, 2021.
International Preliminary Report on Patentability issued in Intl. Appln. No. PCT/JP2019/023022 mailed Dec. 23, 2021. English translation provided.

\* cited by examiner

WELDING DEVICE FOR PLATE LAMINATED BODY IN HORIZONTAL ORIENTATION AND PRODUCING METHOD FOR PLATE STRUCTURE THEREOF

TECHNICAL FIELD

The present disclosure relates to a welding device for a plate laminated body and a producing method for a plate structure.

BACKGROUND

For a heat exchanging part provided for a shell-and-plate type heat exchanger, for example, a plate structure is used which is constituted by a plurality of plates laminated with the same outer shape. The plate structure is produced by joining a pair of plates each having two refrigerant flow holes, where a refrigerant flows in or flows out, at peripheral edges of the refrigerant flow holes to form a pair plate, and further by laminating a plurality of pair plates, as well as joining outer peripheral edges of plates arranged to face each other among the plurality of pair plates. In the plate structure, a refrigerant flowing on a front-surface side of each plate and a refrigerant flowing on a back-surface side exchange heat. Patent Document 1 discloses the configuration of a shell-and-plate type heat exchanger and a producing step of a plate structure (FIG. 13).

Patent Document 2 discloses a plate structure which is constituted by a plurality of plates each having an outer shape which is not a perfect circle but a non-circular shape whose curvature differs in the circumferential direction, and a welding device for welding outer peripheral edges of the non-circular plates arranged to face each other between the pair plates. First, the welding device vertically laminates the plurality of pair plates whose plate surfaces are horizontally disposed, and grips the plates to be fixed with a rotary jig from above and below. Next, the welding device rotates the plurality of laminated plates about a shaft along a lamination direction, and welds the outer peripheral edges of the non-circular plates arranged to face each other between the pair plates with a welding torch in a horizontal position from the side. In the welding device, poor welding is suppressed by holding a torch angle of the welding torch always constant relative to the curvature change of the outer peripheral edge of the non-circular plate.

CITATION LIST

Patent Literature

Patent Document 1: JP5690532B (FIG. 13)
Patent Document 2: WO2018-066136A1

SUMMARY

Technical Problem

Since the welding torch is in the horizontal position in the welding device disclosed in Patent Document 2, a subtle disturbance such as sag is likely to occur in a welding bead under the influence of gravity, which may cause poor welding. Further, the plate laminated body disposed in the vertical direction may slightly be inclined with respect to the lamination direction (axial direction) due to thermal distortion in welding. In this case, there is no means for effectively correcting the inclination during welding. Consequently, a problem arises, such as occurrence of a constraint on number of laminations in the plate laminated body.

An object of an embodiment according to the present disclosure is to suppress occurrence of deflection and inclination with respect to the lamination direction due to thermal distortion, when outer peripheral edges of a plurality of laminated plates are welded.

Solution to Problem (1) A welding device for a plate laminated body according to an embodiment includes a welding torch, a chuck for gripping the plate laminated body with a lamination direction being in a horizontal position, and at least one support extending along the lamination direction for supporting the plate laminated body from below.

In the present specification, a "plate laminated body" refers to a plate laminated body where a plurality of plates are laminated in a direction orthogonal to plate surfaces, and in at least one set of adjacent plates, outer peripheral edges thereof are in a positional relationship available for butt welding. The plate laminated body is constituted by at least two plates, and these two plates are in the positional relationship allowing unwelded outer peripheral edges of the two plates to undergo butt welding. Further, a "lamination direction" is a direction in which the plurality of plates constituting the plate laminated body are laminated, and is also a direction orthogonal to a plate surface of each plate. The lamination direction coincides with the axis direction of the plate laminated body formed after the plurality of laminated plates are welded.

In the above configuration (1), the plate laminated body gripped in the horizontal position by the chuck is rotated around the axis of the plate laminated body while being supported from below by the above-described support, and the outer peripheral edges of the respective plates are welded by the welding torch. Another plate is further welded to the plate laminated body, where the outer peripheral edges are welded and integrated, sequentially by the same method, making it possible to increase the number of plates in the plate laminated body. During welding, the plurality of plates each receive an equal support reaction force from the support, and thus deflection and inclination with respect to the lamination direction due to thermal distortion in welding are corrected by the equal support reaction force applied to each plate from the support. Thus, it is possible to suppress deflection and inclination with respect to the lamination direction (axial direction) of the plate laminated body after welding.

(2) In an embodiment, in the above configuration (1), the chuck is configured to be able to rotate the plate laminated body around an axis along the lamination direction, and the at least one support is constituted by a support roller.

With the above configuration (2), since the at least one support is constituted by the support roller, it is possible to rotatably support the plate laminated body supported by the support roller. Therefore, with the welding torch disposed at a fixed position on the outer side of the plate laminated body, it is possible to easily weld the butted outer peripheral edges of the adjacent plates while rotating the plate laminated body.

(3) In an embodiment, in the above configuration (2), the support roller is configured to make a driven rotation in accordance with the rotation of the plate laminated body.

With the above configuration (3), since the support roller makes the driven rotation, no friction is caused between the rotating plate laminated body and support roller.

Thus, each of the plurality of plates constituting the plate laminated body does not receive an extra force from the support roller, making it possible to suppress occurrence of distortion and deformation in the outer peripheral edge of each plate.

(4) In an embodiment, in any one of the above configurations (1) to (3), the at least one support is configured to include a first support and a second support disposed on both sides of a vertical surface passing through a rotation center of the chuck.

With the above configuration (4), since the first support and the second support are disposed on the both sides of the vertical surface passing through the rotation center of the plate laminated body, it is possible to stably support the plate laminated body.

(5) In an embodiment, in any one of the above configurations (1) to (4), the welding device for the plate laminated body includes a drive part for moving the support along a vertical direction, and a control part for controlling a support height of the support based on a rotation angle of the chuck.

With the above configuration (5), since the above-described control part controls the support height of the support based on the rotation angle of the chuck, even if the plurality of plates constituting the plate laminated body are the non-circular plates, it is possible to adjust the support height of the support in accordance with the shape of the non-circular plates. Thus, it is possible to weld the butted outer peripheral edges while holding the rotation center of the plate laminated body at the fixed position.

In the present specification, the "non-circular plate" refers to not a plate whose whole circumference of the outer peripheral edge is composed by an arc having the same curvature in the circumferential direction like a perfect circle, but refers to a plate of a shape having a curvature which is at least partially different in the circumferential direction. For example, when the plate laminated body is rotated about the axis by the chuck, the non-circular plate has a plate surface whose length from the rotation center to the outer peripheral edge is different in the circumferential direction, like an ellipsoidal plate. For instance, the plate shape is not limited to a shape whose outer peripheral edge is composed of only arc, such as an ellipse, but may include a shape other than arc in a part of the outer peripheral edge.

(6) In an embodiment, in the above configuration (5), the drive part includes a servomotor, a ball screw disposed along the vertical direction and supporting the support, and a power transmission part configured to transmit power of the servomotor to vertically move the ball screw by the power.

With the above configuration (6), including the drive part of the above-described configuration, it is possible to accurately adjust the vertical position of the support with the simple configuration.

(7) In an embodiment, in the above configuration (5) or (6), the control part is configured to control the support height of the support in consideration of a load applied to the support by the plate laminated body.

With the above configuration (7), since the control part controls the support height of the support in consideration of the load of the plate laminated body applied to the support besides the rotation angle of the chuck, during welding, with the support, it is possible to apply a constant load to the respective outer peripheral edges of the plates constituting the plate laminated body in the entire circumferential region. Further, it is possible to control the support height of the support while grasping a variation in load of the plate laminated body due to an individual difference such as the weight of each plate. Thus, it is possible to support the plate laminated body without circumferentially causing partial deflection and depressions in the outer peripheral edge of each plate.

(8) In an embodiment, in the above configuration (6), a value of a drive current supplied to the servomotor represents a load applied to the support by the plate laminated body, and the control part is configured to control an operation of the drive part and to control the support height of the support in consideration of the value of the drive current.

With the above configuration (8), since the control part takes the value of the drive current supplied to the servomotor into consideration, it is possible to easily grasp the variation in load of the plate laminated body due to the individual difference such as the weight of each plate.

(9) In an embodiment, in any one of the above configurations (1) to (8), the plate laminated body is constituted by a plurality of non-circular plates laminated with the same outer shape.

With the above configuration (9), even if the plurality of plates constituting the plate laminated body are the non-circular plates, since the plate laminated body gripped in the horizontal position by the chuck is supported from below by the support extending along the lamination direction, the plurality of plates constituting the plate laminated body each receive the equal support reaction force from the support. Thus, deflection and inclination with respect to the lamination direction due to thermal distortion in welding are corrected by the equal support reaction force applied to each plate from the support. Thus, it is possible to suppress deflection and inclination with respect to the lamination direction of the plate laminated body after welding.

(10) In an embodiment, in any one of the above configurations (1) to (9), the welding torch is disposed above the plate laminated body and configured to be able to perform downward welding.

With the above configuration (10), since the welding torch can perform downward welding, it is possible to suppress sag of a welding bead due to an influence of gravity, and to suppress poor welding.

(11) A producing method for a plate structure according to an embodiment includes a positioning step of causing at least two sets of pair plates, each of which is constituted by a pair of plates joined such that outer peripheral edges thereof are superimposed in a front view, to be supported from below with a lamination direction being in a horizontal position by at least one support such that the outer peripheral edges of the plates are butted between the at least two sets of pair plates, and a welding step of welding, with a welding torch, the outer peripheral edges butted to each other, by rotating the at least two sets of pair plates in a circumferential direction of the pair plates.

With the above method (11), since the plurality of pair plates gripped in the horizontal position by the chuck is supported from below by the support extending along the lamination direction, the plurality of pair plates constituting the plate laminated body each receive the equal support reaction force from the support. Thus, deflection and inclination with respect to the lamination direction due to thermal distortion in welding are corrected by the equal support reaction force applied to each pair plate from the support. Thus, it is possible to produce the plate structure without any deflection and inclination with respect to the lamination direction.

Advantageous Effects

According to some embodiments, it is possible to suppress deflection and inclination with respect to a lamination direction due to thermal distortion in welding, when adjacent outer peripheral edges of a plurality of laminated plates constituting a plate laminated body are welded.

DETAILED DESCRIPTION

Figure 1:
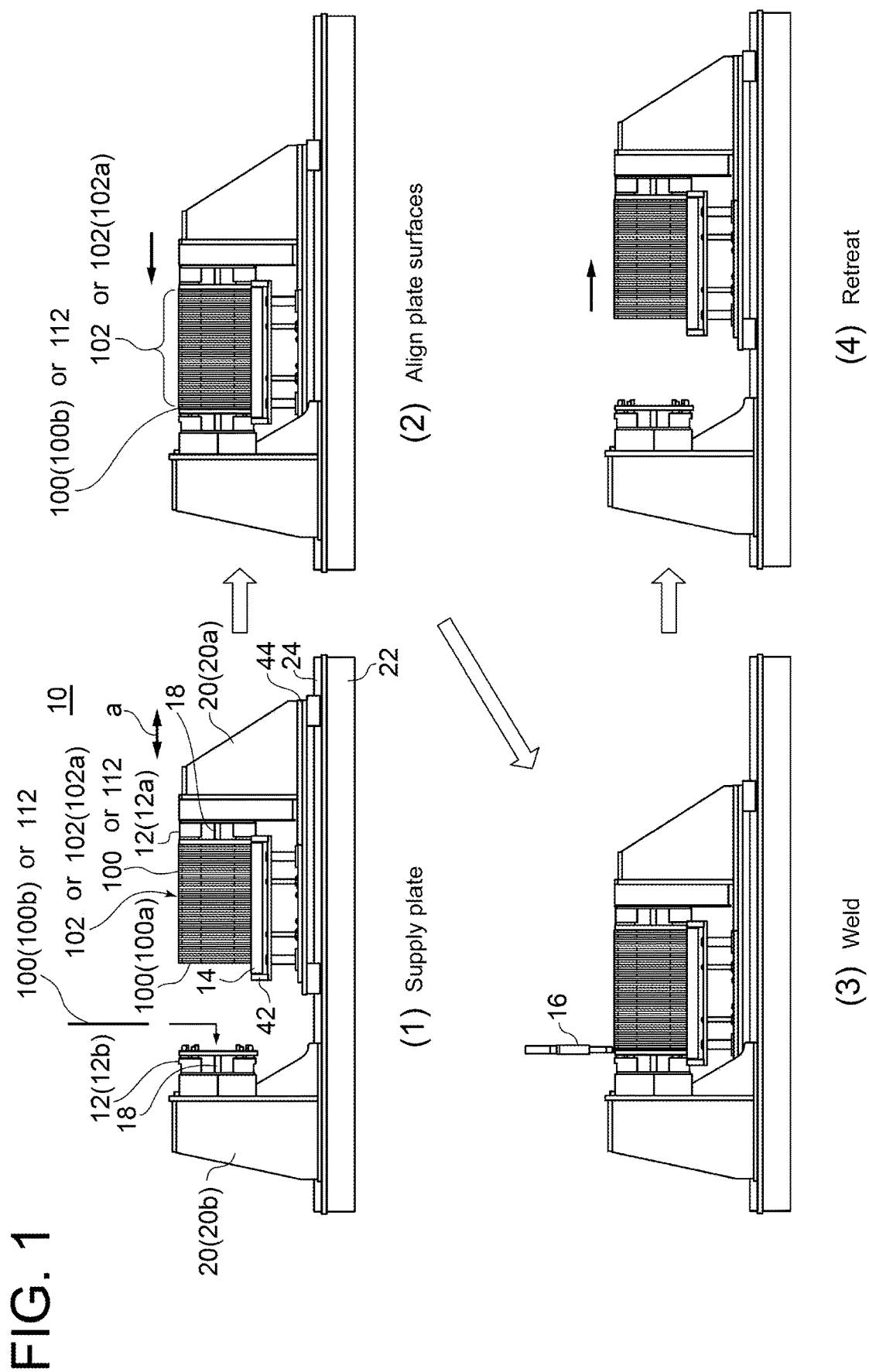
FIG. 1 is a front view of a welding device, and is an explanatory diagram showing a procedure of a welding process according to an embodiment.

Some embodiments of the present invention will be described below with reference to the accompanying drawings. It is intended, however, that unless particularly identified, dimensions, materials, shapes, relative positions and the like of components described or shown in the drawings as the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

Figure 2:
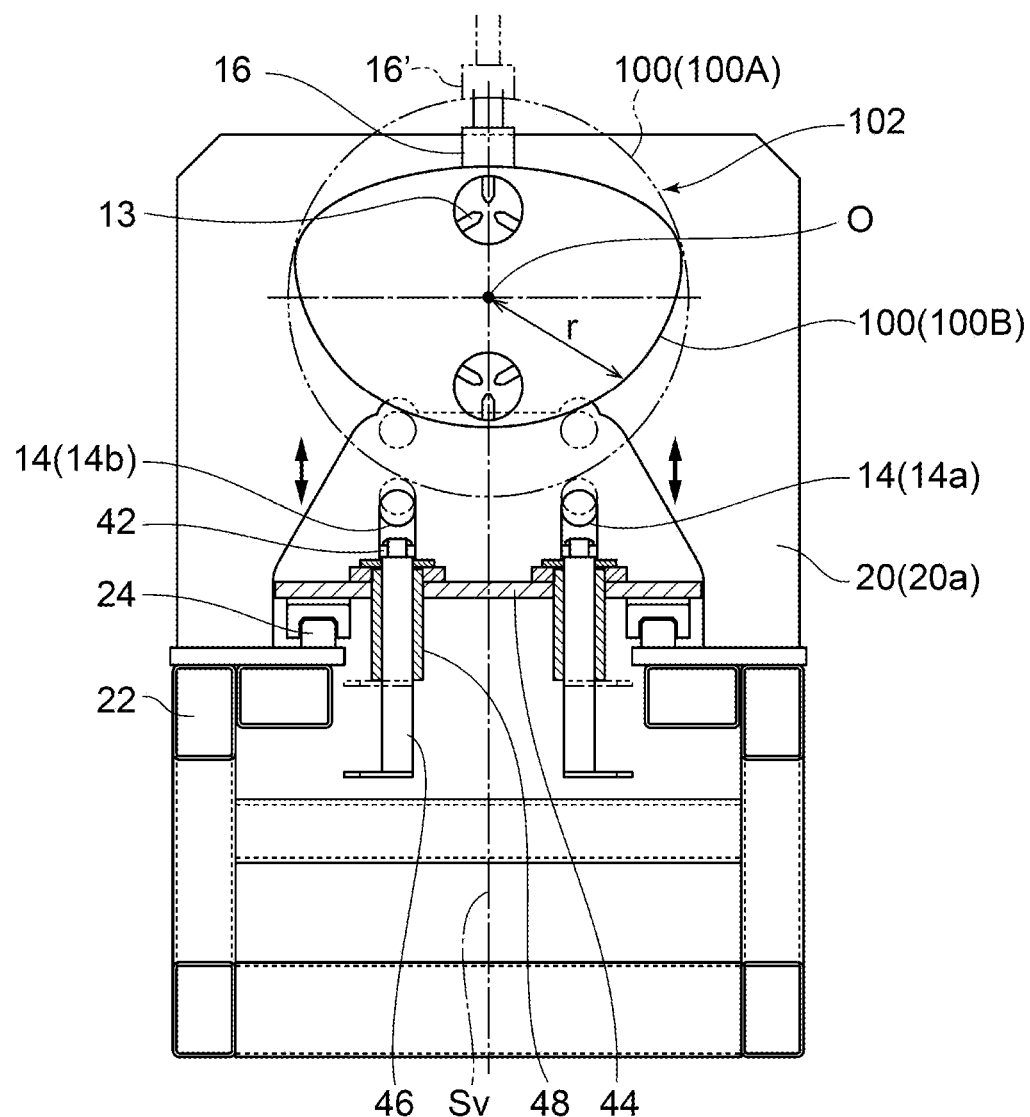
FIG. 2 is a side view of the welding device according to an embodiment.

FIG. 1 shows a welding process of a plate laminated body using a welding device 10 according to an embodiment. FIG. 2 is a side view of the welding device 10. As shown in FIG. 1, a chuck 12 grips a plate laminated body 102, plates 100, and the like to be welded from both sides with a lamination direction being in a horizontal position (an axis direction of the plate laminated body 102). At least one support 14 extends along the lamination direction and supports, from below, the plate laminated body 102 and the like gripped by the chuck 12. A welding torch 16 is disposed on the radially outer side of the plate laminated body 102 supported by the support 14. In the embodiment shown in FIG. 1, a process is shown in which the plurality of plates 100 that constitute the plate laminated body 102 supported by the support 14 have already been welded at outer peripheral edges of the adjacent plates 100, an outer peripheral edge of the plate 100 (100a) in the axial end portion of the plate laminated body 102 and an outer peripheral edge of the plate 100 (100b) newly introduced into the welding device 10 are welded.

The plate laminated body 102 and the plate 100 (100b) are gripped with a lamination direction being in a horizontal position by the chuck 12, and are supported from below by the support 14. In this state, the plate 100 (100a) and the plate 100 (100b) are disposed in a positional relationship where the outer peripheral edges of the plate 100 (100a) and the plate 100 (100b) are superimposed and butted in the lamination direction. Then, the butted outer peripheral edges are welded by the welding torch 16 while the plate 100 (100a) and the plate 100 (100b) are rotated around the axis of the plate laminated body 102 (in the circumferential direction of the plates 100) by the chuck 12. By repeating the same welding process with respect to the plate laminated body 102 where the plate 100 (100b) is welded, it is possible to increase the number of laminated plates 100 that constitute the plate laminated body 102.

During welding, the plate 100 (100b) and the plurality of plates 100 constituting the plate laminated body 102 each receive an equal support reaction force from the support 14. Therefore, deflection and inclination with respect to the lamination direction due to thermal distortion in welding are corrected by the equal support reaction force applied to each plate from the support 14. Thus, it is possible to suppress deflection and inclination with respect to the lamination direction of the plate laminated body 102 after welding.

In an embodiment, the plurality of plates 100 constituting the plate laminated body 102 have the same outer shape and size. Further, as shown in FIG. 1, the chuck 12 is constituted by a pair of chucks 12 (12a, 12b). The pair of chucks 12 (12a, 12b) are mounted on stands 20 (20a, 20b), respectively, and are configured to sandwich the plate 100 (100b) and the plate laminated body 102 supported by the support 14 from both sides in the lamination direction. The stands 20 (20a, 20b) are disposed on a base 22 and on an upper surface of the base 22, a rail 24 is disposed along a direction of an arrow a. The one stand 20 (20a) and the support 14 are fixed to a common frame 44, and the frame 44 is slidable on the rail 24 in the direction of the arrow a. The other stand 20 (20b) is fixed on the base 22. Further, as shown in FIG. 2, the chuck 12 grips an inner peripheral edge 110 (see FIG. 6) of the plate 100 with clicks 13.

In FIG. 1, in step (1), the frame 44 is spaced apart from the stand 20 (20b), and the plate 100 (100b) is introduced to be mounted to the chuck 12 (12b). In step (2), the frame 44 approaches the stand 20 (20b), and the plate 100 (100b) and the plate laminated body 102 are gripped by the chucks 12 (12a, 12b), respectively. In step (3), the outer peripheral edges of the plate 100 (100a) and the plate 100 (100b) are welded by the welding torch 16. In step (4), the frame 44 separates from the stand 20 (20b).

Figure 6:
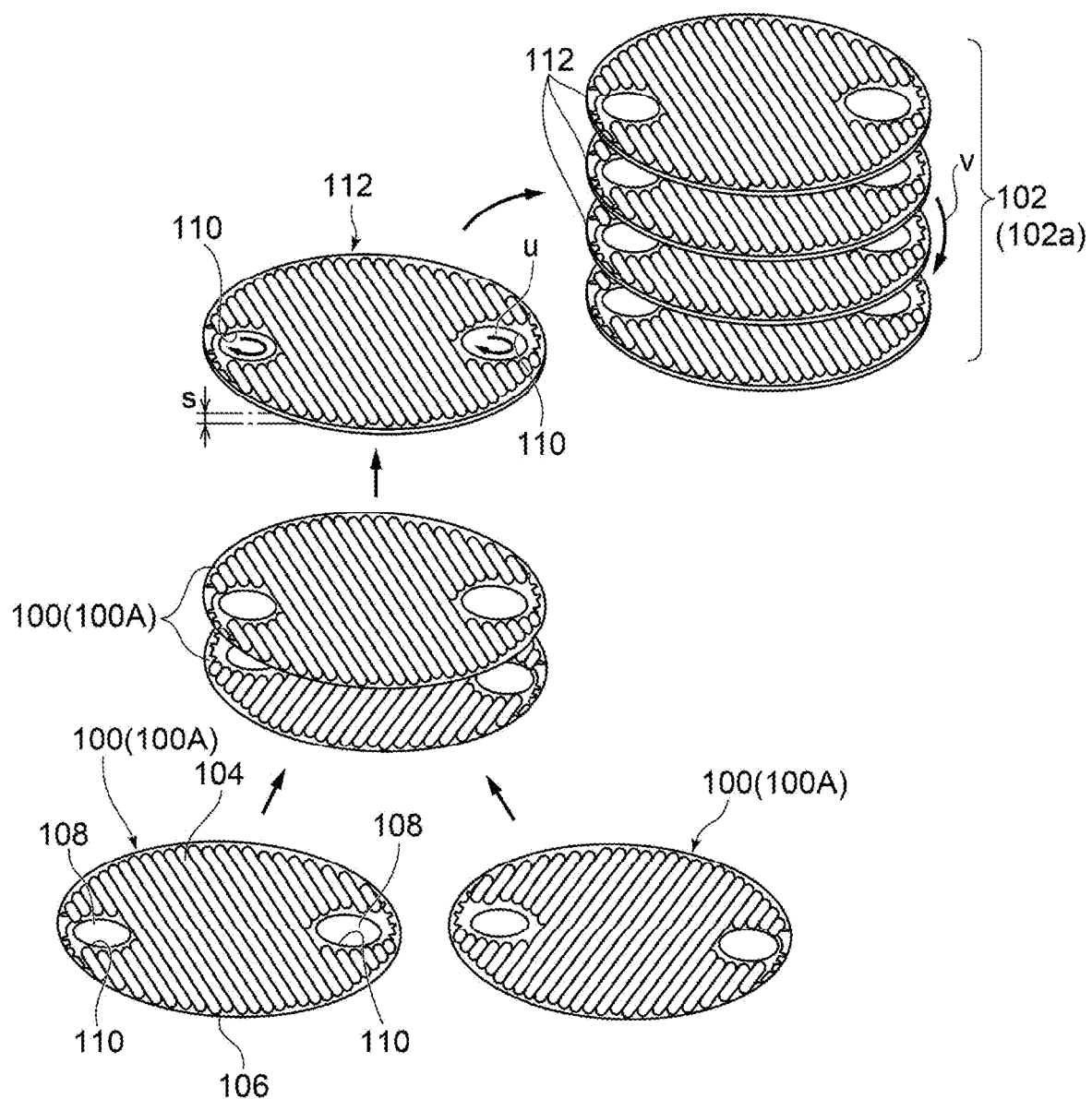
FIG. 6 is an explanatory diagram showing a production process of a plate structure according to an embodiment.

Herein, a producing step of the plate structure 102 (102a) as an embodiment of the plate laminated body 102 will be described. The plate structure 102 (102a) is used as a heat exchanging part of a shell-and-plate type heat exchanger. FIG. 6 shows a producing step of the heat exchanging part illustrated in FIG. 13 of Patent Document 1. In this example, as the plate 100, the plate 100 (100A) having a perfect circular outer shape is used. In each of the plurality of perfect circular plates 100 (100A), protrusions and recesses 104 having a waveform cross-section are formed. In the plate 100 (100A), two refrigerant flow holes 108 whose phases are different by 180 degrees with reference to the center are drilled in the vicinity of an outer peripheral edge 106. The outer peripheral edge 106 of the plate 100 (100A)

and inner peripheral edges 110 of the plate 100 (100A) forming the refrigerant flow holes 108 are formed in a narrow annular flat surface connected to the protrusions and recesses 104. A plate-like body forming a flat surface of the outer peripheral edge 106 and plate-like bodies forming flat surfaces of the inner peripheral edges 110 have a height difference by a step between the protrusion and the recess of the protrusions and recesses 104.

First, the two plates 100 (100A) are superimposed with back surfaces thereof being opposite to each other (with the protrusions or the recesses of the protrusions and recesses 104 being arranged back-to back), and the inner peripheral edges 110 of the refrigerant flow holes 108 arranged to face each other are circumferentially welded as indicated by an arrow u, thereby producing a pair plate 112. At this time, between the outer peripheral edges 106 of the adjacent plates 100 (100A), a gap s is formed which is twice the size of the step between the protrusion and the recess of the protrusions and recesses 104 formed in the plates 100 (100A). Next, for example, using the welding device 10, the plurality of pair plates 112 are laminated while being supported by the support 14, thereby bringing outer peripheral edges of the adjacent pair plates 112 into contact with each other. At this stage, a laminated body constituted by the pair plates 112 as an embodiment of the plate laminated body 102 is formed. Further, the outer peripheral edges which are in contact with each other are circumferentially welded as indicated by an arrow v, thereby producing the plate structure 102 (102a). The plate structure is immersed in a refrigerant stored in a hollow container of the shell-and-plate type heat exchanger.

As described above, the plate structure 102 (102a) is produced by alternately welding the inner peripheral edges 110 of the refrigerant flow holes 108 and the outer peripheral edges 106 of the plurality of plates 100 in the lamination direction. Consequently, on one surface side of each plate, a first flow path opened to an interior space of the above-described hollow container, and a second flow path closed with respect to the interior space of the hollow container and communicating with the refrigerant flow holes 108 are formed. Then, a first refrigerant flowing through the first flow path and a second refrigerant flowing through the second flow path can exchange heat via the plates. The plates 100 constituting the plate structure 102 (102a) may be the non-circular plates 100 (100B), as shown in FIG. 2.

Figure 3:
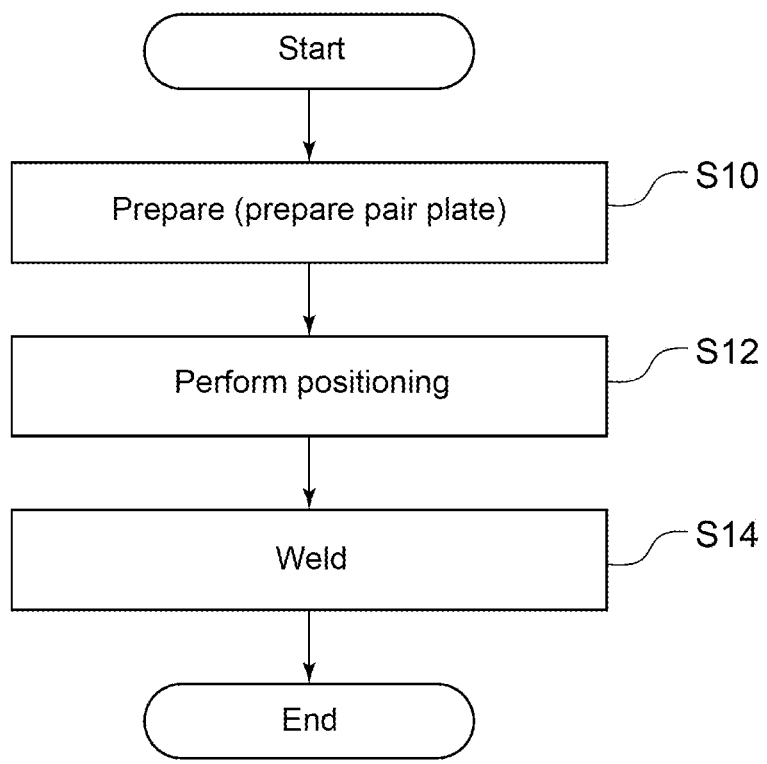
FIG. 3 is a flowchart of a welding method according to an embodiment.

As shown in FIG. 3, a producing method for the plate structure 102 (102a) according to an embodiment first prepares at least two sets of pair plates 112 each of which is constituted by a pair of plates 100 joined such that the outer peripheral edges thereof are superimposed in a front view (preparation step S10). The pair plate 112 is produced by, for example, the procedure shown in FIG. 6. Next, the two sets of pair plates 112 are arranged such that the outer peripheral edges 106 of the plates 100 arranged to face each other between the two sets of pair plates 112 are butted. These two sets of pair plates 112 are gripped from both sides by the chucks 12 (12a, 12b) in the horizontal position, and are supported from below by the support 14 (positioning step S12). Subsequently, the two sets of pair plates 112 positioned by the support 14 are rotated in the circumferential direction (around the axis) of the pair plates 112, and the outer peripheral edges 106 of the plates 100 butted to each other are welded by the welding torch 16, thereby producing the plate structure 102 (102a) (welding step S14). By repeating the above-described process with respect to the produced plate structure 102 (102a), it is possible to increase the number of pair plates 112 that constitute the plate structure 102 (102a).

With the above method, during welding, since the plurality of pair plates 112 in the horizontal position are supported from below by the support 14, each of the plurality of pair plates 112 receives the equal support reaction force from the support 14. Thus, deflection and inclination with respect to the lamination direction due to thermal distortion in welding are corrected by the equal support reaction force applied to each pair plate 112 from the support 14. Thus, it is possible to produce the plate structure 102 (102a) without any deflection and inclination with respect to the lamination direction.

In the embodiment shown in FIG. 1, first, in step (1), the plate structure 102 (102a), which is produced by the outer peripheral edges 106 of the plates 100 arranged to face each other between the two sets of pair plates 112 that have already been butted and welded, is supported from below by the support 14. Moreover, one end of the plate structure 102 (102a) is gripped by the chuck 12 (12a). The stand 20 (20a) is at a position away from the stand 20 (20b) in the direction of the arrow a. Meanwhile, still another set of pair plates 112 is introduced into the welding device 10 and is gripped by the chuck 12 (12b). Next, in step (2), the chuck 12 (12a) and the support 14 move toward the chuck 12 (12b), and the plate structure 102 (102a) and the new pair plate 112 are in a positional relationship allowing the outer peripheral edges of the adjacent plates 100 to undergo butt welding.

Next, in step (3), the outer peripheral edges of the plates 100 butted between the adjacent pair plates 112 are welded over the entire circumference by the welding torch 16 disposed on the radially outer side of the plate structure 102 (102a), thereby producing the plate structure 102 (102a) where the new pair plate 112 is added to the existing plate structure 102 (102a). In step (4), after the welding, the plate structure 102 (102a) is removed from the chuck 12 (12b), and the chuck 12 (12a) and the support 14 each return to the original position, that is, the stand 20 (20a) returns to the position away from the stand 20 (20b). Then, the process returns to step (1), and a further new set of pair plates 112 is prepared and gripped by the chuck 12 (12b).

In an embodiment, as shown in FIG. 1, the chuck 12 (12a, 12b) is configured to be able to rotate the gripped plate 100 (100b) and the plate laminated body 102 around the axis of a rotational shaft 18, that is, about a rotation center O along the lamination direction. A device (not shown) for rotating the chuck 12 (12a, 12b) is disposed in the stand 20 (20a, 20b). Further, the support 14 is constituted by a support roller. Thus, in the welding process, the support 14 can rotatably support the supported plate 100 (100b) and the plate laminated body 102. Therefore, with the welding torch 16 fixed at a fixed position on the outer side of the plate 100 (100b) and the plate laminated body 102, it is possible to easily weld the outer peripheral edges of the adjacent plates 100 between the plate 100 (100b) and the plate laminated body 102, while rotating the plate 100 (100b) and the plate laminated body 102.

In an embodiment, the support 14 constituted by the support roller is configured to make a driven rotation in accordance with rotations of the supported plate laminated body 102 and the like. Thus, each of the plurality of plates 100 constituting the plate laminated body 102 does not receive an extra force from the support roller, making it possible to suppress occurrence of distortion and deformation in the outer peripheral edge 106 of each plate 100.

In an embodiment, as shown in FIG. 2, the support 14 is constituted by the first support 14 (14a) and the second support 14 (14b) disposed on both sides of a vertical surface Sv passing through the rotation center O of the chuck 12. Thus, it is possible to stably support the plate laminated body 102 and the like.

Figure 4:
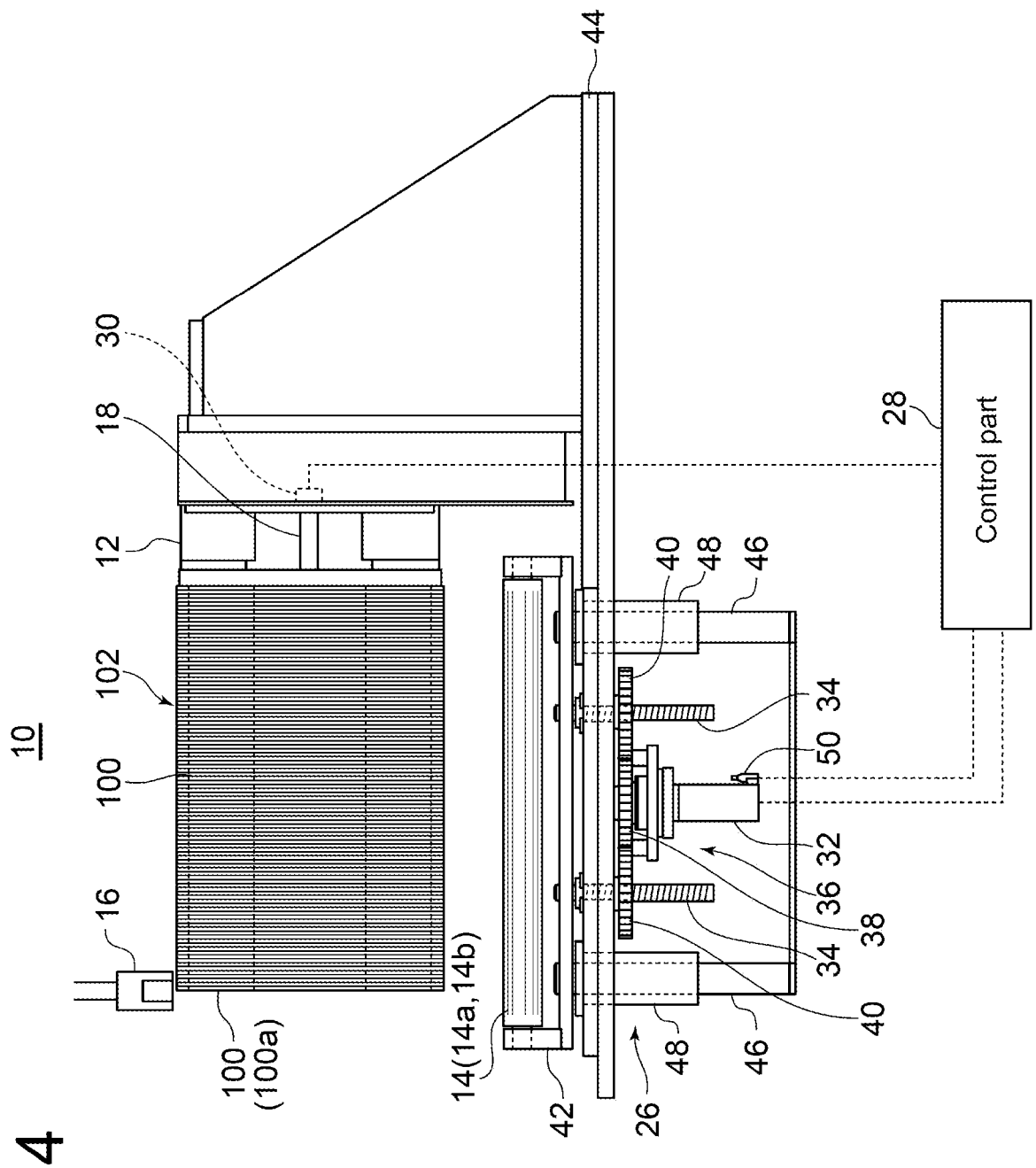
FIG. 4 is a front view of the welding device according to an embodiment.

In an embodiment, as shown in FIG. 4, the welding device 10 includes a drive part 26 for moving the support 14 along the vertical direction. A control part 28 controls the operation of the drive part 26 and controls a support height of the support 14 based on a rotation angle of the chuck 12. When the plurality of plates 100 constituting the plate laminated body 102 are the non-circular plates 100 (100B) as shown in FIG. 2, a length r from the rotation center O of the chuck 12 to the outer peripheral edge 106 varies depending on the rotation angle of the chuck 12. According to the present embodiment, since the control part 28 controls the support height of the support 14 based on the rotation angle of the chuck 12, even if the plate 100 is the non-circular plate 100 (100B), it is possible to adjust the support height of the support 14 in accordance with the shape of the non-circular plate 100 (100B). Therefore, even in a case where the plate laminated body 102 constituted by the non-circular plates is welded, it is possible to weld the outer peripheral edges of the plates constituting the plate laminated body 102 while keeping the rotation center O of the plate laminated body 102 at the fixed position.

In an embodiment, as shown in FIG. 4, an angle sensor 30 for detecting the rotation angle of the chuck 12 is provided, and the detected value by the angle sensor 30 is sent to the control part 28. The control part 28 controls the support height of the support 14 based on the detected value sent from the angle sensor 30.

In an embodiment, as shown in FIG. 4, the drive part 26 includes a servomotor 32, and ball screws 34 disposed along the vertical direction and supporting the support 14. Power of the servomotor 32 is transmitted to the ball screws 34 via a power transmission part 36. The support 14 moves vertically by the power transmitted from the power transmission part 36. By the drive part 26 of the above-described configuration, it is possible to accurately adjust the vertical position of the support 14 with the simple configuration.

In an embodiment, as shown in FIG. 4, the power transmission part 36 includes a gear 38 mounted on an output shaft of the servomotor 32, and gears 40 where screw portions formed in center through holes screw with the ball screws 34, respectively. The gear 38 and the gears 40 engage with each other, transmitting the rotation of the output shaft of the servomotor 32 to the ball screws 34 and allowing the ball screws 34 to move vertically.

In an embodiment, the two gears 40 are disposed across the gear 38 along the lamination direction. Thus, it is possible to vertically move the support 14 extending along the lamination direction without being inclined in the horizontal direction.

In an embodiment, as shown in FIG. 4, the support 14 is constituted by the support roller, the welding device 10 includes a seat 42 for rotatably supporting the support roller, and the seat 42 is fixed to the frame 44. The upper end portion of each ball screw 34 penetrates a through hole formed in the frame 44 and is coupled to the seat 42. Thus, the support 14 can vertically move together with the seat 42. As described above, since the ball screw 34 is coupled to the seat 42, an extra load is not applied to the support 14. Thus, it is possible to accurately hold the support 14 at the support position.

The welding device 10 also includes a pair of guide shafts 46, 46 disposed on the outer side of the gears 40 in the lamination direction along the vertical direction, and a pair of guides 48, 48 each having a through hole where a corresponding one of the guide shafts 46 slidably penetrates. The upper end portion of each guide shaft 46 is coupled to the seat 42, and the upper end portion of each guide 48 is coupled to the frame 44. With the guide shafts 46 and the guides 48, it is possible to smoothly perform vertical movement of the support 14.

In an embodiment, as shown in FIG. 4, the plate laminated body 102 detects the load applied to the support 14, and the control part 28 is configured to control the support height of the support 14 in consideration of a detected value of the load besides the rotation angle of the chuck 12. Thus, during welding, with the support 14, it is possible to apply a constant load to the outer peripheral edges 106 of the plurality of plates 100 constituting the plate laminated body 102 in the entire circumferential region. Further, it is possible to control the support height of the support 14 while grasping a variation in load of the plate laminated body 102 due to an individual difference such as the weight of each plate 100. Therefore, it is possible to support the plate laminated body 102 without causing partial deflection and depressions in the outer peripheral edges 106.

In an embodiment, as shown in FIG. 4, the welding device 10 includes a load sensor 50 for detecting the load applied to the support 14 by the plate laminated body 102, and the detected value by the load sensor 50 is sent to the control part 28. The control part 28 is configured to control the support height of the support 14 based on the detected value sent from the load sensor 50.

In an embodiment, the control part 28 is configured to control the operation of the drive part 26 and to control the support height of the support 14 in consideration of a value of a drive current supplied to the servomotor 32 besides the rotation angle of the chuck 12. The value of the drive current supplied to the servomotor 32 represents a load applied to the support 14 by the plate laminated body 102. Therefore, by detecting the value of the drive current supplied to the servomotor 32, it is possible to easily grasp the variation in load of the plate laminated body 102 due to the individual difference such as the weight of each plate 100.

In an embodiment, as shown in FIG. 2, the plate laminated body 102 is constituted by, as the plates 100, the plurality of non-circular plates 100 (100B) laminated with the same outer shape. Even if the plates 100 constituting the plate laminated body 102 are the non-circular plates 100 (100B), since the plate laminated body 102 in the horizontal position is welded while being supported from below by the support 14, the plurality of non-circular plates 100 (100B) constituting the plate laminated body 102 receives a reaction force equal to the self-weight of the plate laminated body 102 from the support 14. Thus, deflection and inclination with respect to the lamination direction (the axis direction of the rotational shaft 18) caused by thermal deformation in welding are corrected by the support 14. Thus, it is possible to suppress deflection and inclination with respect to the lamination direction of the plate laminated body 102 after welding.

In an embodiment, the plate laminated body 102 is formed by laminating at least two sets of pair plates 112 each of which is constituted by a pair of non-circular plates 100 (100B) joined such that the outer peripheral edges 106 are superimposed in the front view.

In an embodiment, as shown in FIG. 2, the welding torch 16, 16' is disposed above the plate laminated body 102 and is configured to be able to perform downward welding.

Thus, it is possible to suppress sag of a welding bead due to an influence of gravity, and to suppress poor welding.

Figure 5:
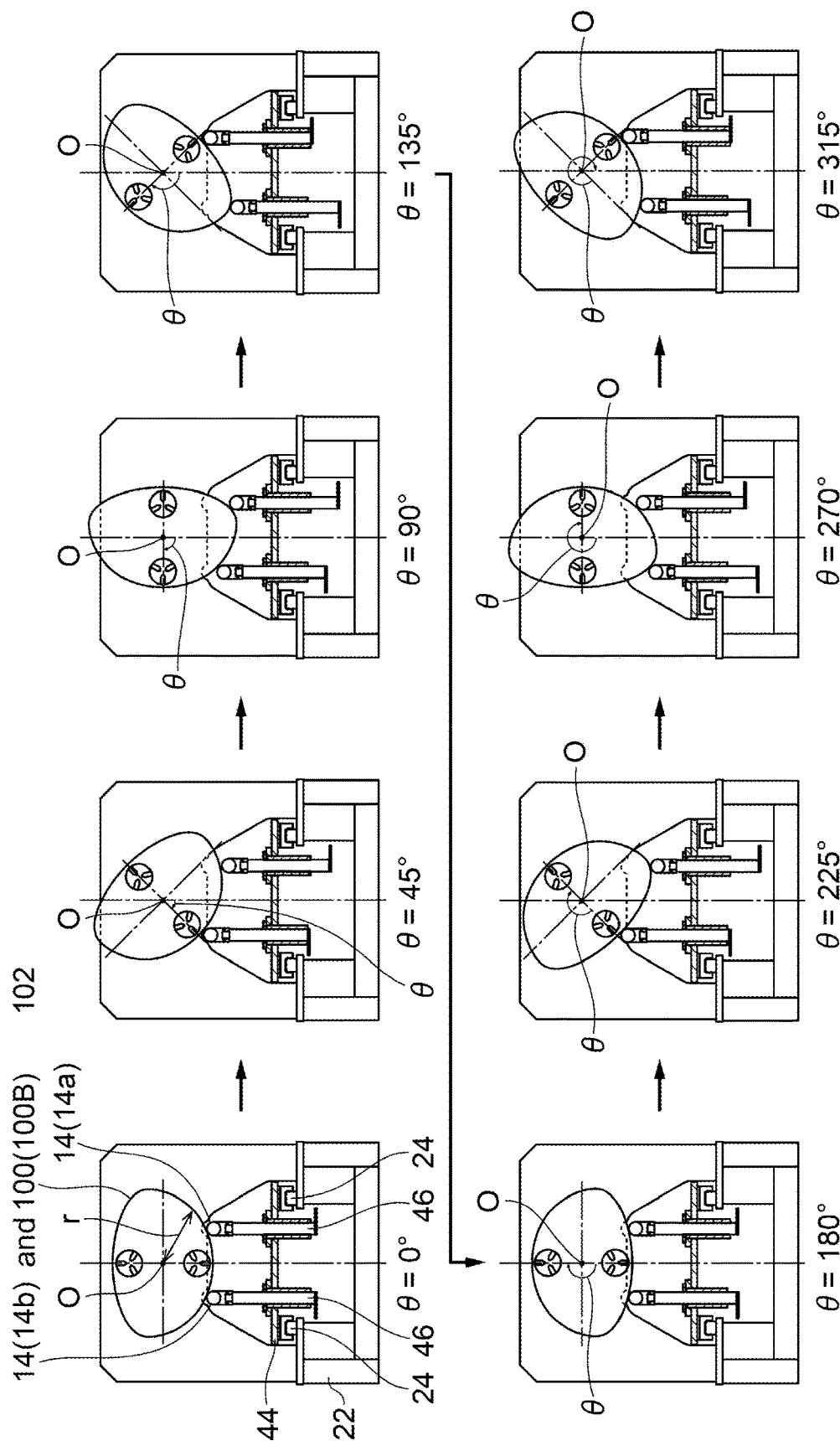
FIG. 5 is an explanatory diagram showing the welding process by the welding device according to an embodiment.

FIG. 5 is an explanatory diagram showing in sequence the welding step of the plate laminated body 102 constituted by the non-circular plates 100 (100B). In the diagram, a numerical value shown below each drawing indicates a rotation angle θ of the chuck 12. As shown in the diagram, in the case of the plate laminated body 102 constituted by the non-circular plates 100 (100B), since the length r from the rotation center θ to the plate outer peripheral edge 106 supported by the support 14 (14*a*, 14*b*) varies depending on the rotation angle θ of the chuck 12, the support height of the support 14 (14*a*, 14*b*) is adjusted by the control part 28. Thus, it is possible to weld the outer peripheral edges 106 of the adjacent non-circular plates 100 (100B) while fixing the rotation center O of the plate laminated body 102.

INDUSTRIAL APPLICABILITY

According to some embodiments of the present disclosure, when producing a plate structure or the like which is applicable to, for example, a heat exchanging part of a shell-and-plate type heat exchanger by welding a plate laminated body, it is possible to suppress deflection and inclination with respect to a lamination direction due to thermal deformation during welding. Therefore, if the plate structure or the like is applied to the above-described heat exchanging part, it is possible to accurately form flow paths for refrigerants flowing through both sides of a plate as designed, making it possible to maintain heat exchange efficiency high.

REFERENCE SIGNS LIST

10 Welding device
12 (12*a*, 12*b*) Chuck
13 Click
14 (14*a*, 14*b*) Support
14*a* First support
14*b* Second support
16, 16' Welding torch
18 Rotational shaft
20 (20*a*, 20*b*) Stand
22 Base
24 Rail
26 Drive part
28 Control part
30 Angle sensor
32 Servomotor
34 Ball screw
36 Transmission part
38, 40 Gear
42 Seat
44 Frame
46 Guide shaft
48 Guide
50 Load sensor
100 (100*a*, 100*b*) Plate
100A Non-circular plate
100B Perfect circular plate
102 Plate laminated body
102 (102*a*) Plate structure
104 Protrusions and Recesses
106 Outer peripheral edge
108 Refrigerant flow hole
110 Inner peripheral edge
112 Pair plate
O Rotation center
θ Rotation angle

The invention claimed is:

1. A welding device for a plate laminated body, comprising:
  a welding torch;
  a chuck for gripping the plate laminated body with a lamination direction being in a horizontal position;
  at least one support extending along the lamination direction for supporting the plate laminated body from below:
  a drive part for moving the at least one support along a vertical direction; and
  a control part for controlling an operation of the drive part and controlling a support height of the at least one support based on a rotation angle of the chuck.

2. The welding device for the plate laminated body according to claim 1,
  wherein the chuck is configured to rotate the plate laminated body around an axis along the lamination direction, and
  wherein the at least one support is constituted by a support roller.

3. The welding device for the plate laminated body according to claim 2,
  wherein the support roller is configured to make a driven rotation in accordance with the rotation of the plate laminated body.

4. The welding device for the plate laminated body according to claim 1,
  wherein the at least one support is configured to include a first support and a second support disposed on both sides of a vertical surface passing through a rotation center of the chuck.

5. The welding device for the plate laminated body according to claim 1,
  wherein the drive part includes:
  a servomotor;
  a ball screw disposed along the vertical direction and supporting the at least one support; and
  a power transmission part configured to transmit power of the servomotor to vertically move the ball screw by the power.

6. The welding device for the plate laminated body according to claim 5,
  wherein a value of a drive current supplied to the servomotor represents a load applied to the at least one support by the plate laminated body, and the control part is configured to control an operation of the drive part and to control the support height of the at least one support in consideration of the value of the drive current.

7. The welding device for the plate laminated body according to claim 1,
  wherein the control part is configured to control the support height of the at least one support in consideration of a load applied to the at least one support by the plate laminated body.

8. The welding device for the plate laminated body according to claim 1,
  wherein the plate laminated body is constituted by a plurality of non-circular plates laminated with the same outer shape.

9. The welding device for the plate laminated body according to claim 1,
  wherein the welding torch is disposed above the plate laminated body and configured to perform downward welding.

10. A producing method for a plate structure, comprising:
causing at least two sets of pair plates, each of which is constituted by a pair of plates joined such that outer peripheral edges thereof are superimposed in a front view, to be supported from below with a lamination direction being in a horizontal position by at least one support such that the outer peripheral edges of the plates are butted between the at least two sets of pair plates;
welding, with a welding torch, the outer peripheral edges butted to each other, by rotating the at least two sets of pair plates in a circumferential direction of the pair plates;
moving the at least one support along a vertical direction; and
controlling a support height of the at least one support based on a rotation angle of a chuck that grips the at least two sets of pair plates.

* * * * *